(12) United States Patent
Kraenzle

(10) Patent No.: US 7,568,496 B2
(45) Date of Patent: Aug. 4, 2009

(54) DUAL FLANGE TEE

(75) Inventor: David G. Kraenzle, St. Louis, MO (US)

(73) Assignee: Ultraflo Corporation, Ste. Genevieve, MO (US)

( * ) Notice: Subject to any disclaimer, the term of this patent is extended or adjusted under 35 U.S.C. 154(b) by 694 days.

(21) Appl. No.: 11/250,777

(22) Filed: Oct. 14, 2005

(65) Prior Publication Data

US 2006/0082138 A1    Apr. 20, 2006

Related U.S. Application Data

(60) Provisional application No. 60/619,165, filed on Oct. 15, 2004.

(51) Int. Cl.
*F16K 51/00* (2006.01)

(52) U.S. Cl. ............... 137/454.2; 251/143; 251/144; 222/181.1; 222/185.1; 285/133.11

(58) Field of Classification Search ........... 251/143, 251/144, 148, 151; 222/181.1, 460, 531, 222/185.1, 461; 285/133.11; 137/454.2
See application file for complete search history.

(56) References Cited

U.S. PATENT DOCUMENTS

| 1,860,346 | A | | 5/1932 | Anderson | |
| 2,228,857 | A | | 1/1941 | Stephenson | 236/45 |
| 2,895,496 | A | * | 7/1959 | Sanctuary | 251/151 |
| 3,251,122 | A | | 5/1966 | Boteler | 29/157.1 |
| 3,402,731 | A | | 9/1968 | Martin | 137/375 |
| 3,583,668 | A | * | 6/1971 | Nelimarkka | 251/151 |
| 3,654,008 | A | | 4/1972 | Rogers et al. | 156/152 |
| 3,813,023 | A | | 5/1974 | Auray et al. | 228/19 |
| 3,982,727 | A | * | 9/1976 | Nelimarkka | 251/152 |
| 4,652,020 | A | | 3/1987 | Gilroy | 285/47 |
| 4,711,426 | A | * | 12/1987 | Bodnar | 251/151 |
| D297,678 | S | | 9/1988 | Sisk | D34/28 |
| 4,848,396 | A | | 7/1989 | Sisk | 137/375 |
| 5,387,015 | A | | 2/1995 | Sisk | 285/55 |
| 5,676,404 | A | | 10/1997 | Sisk | 285/133.11 |

FOREIGN PATENT DOCUMENTS

GB        489602       1/1938

* cited by examiner

*Primary Examiner*—Stephen M Hepperle
*Assistant Examiner*—Andrew J Rost
(74) *Attorney, Agent, or Firm*—Haverstock Roberts LLP

(57) ABSTRACT

The dual flange hopper tee or other fitting connects to the bottom of a hopper for use in unloading the contents thereof, and has a relatively low profile for ground clearance. When used in conjunction with a valve, the tee or other fitting can be removed from the hopper without requiring removal of the valve, and can allow opening of the valve without interfering with flow through a horizontal pipe section of the fitting.

15 Claims, 4 Drawing Sheets

DUAL FLANGE TEE

This application claims the benefit of U.S. Provisional Application No. 60/619,165, filed Oct. 15, 2004.

TECHNICAL FIELD

This invention relates generally to a tee or other fitting for connection to the bottom of a hopper for use in unloading the contents thereof, and more particularly, to a dual flange tee or other fitting which provides improved ground clearance compared to many prior known tee and fitting constructions, and when used in conjunction with a valve, allows the tee to be removed from the hopper without requiring removal of the valve, and can allow opening of the valve without interfering with flow through a horizontal pipe section of the fitting.

BACKGROUND ART

Commonly, mobile hopper trailers and vehicles are used for carrying bulk commodities such as industrial products such as pelletized plastics and the like, and food products such as milled flours and the like. Typically, the hoppers include multiple sections or compartments for receiving and holding the products, each section or compartment having a generally conical or tapered bottom portion terminating at a discharge outlet. A discharge or dump valve is typically connected to the outlet and to an inverted tee or other fitting located beneath the valve, the tee or other fitting being connected on both ends to generally horizontal pipes or hoses connected in turn to the tees or fittings of the other sections or compartments. In this manner, a generally horizontal path through the fittings connected pipes or hoses is formed for the flow of the materials discharged from the hopper sections or compartments. The discharge or dump valves can selectably be opened to allow the material to be discharged from the selected hopper therethrough, under force of gravity and/or a pressure differential between the hopper section and the flow path, vibration often being used to facilitate the material flow from the hopper and to prevent bridging wherein the material forms a self-supporting arch or dome above the discharge outlet. A pneumatic flow is typically generated through the flow path by a blower or the like disposed at one end of the flow path, to carry the discharged material through the flow path to a receiver or connection at another end of the path.

A disadvantage of many of the known hopper tee and other fitting constructions is that, particularly when used with a valve, they have a substantial downward extent beneath the hopper section, so as to be subject to potential damage from contact with road hazards, particularly railroad tracks and curbs, which the hoppers cross from time to time. And, another disadvantage of the known hopper tees is that if they become damaged, or otherwise are rendered inoperable, for instance, such as due to blockage therein, or the like, they cannot be easily removed from the hopper, without either removing the valve or separately securing the valve to the hopper.

Reference in this regard, Sisk U.S. Pat. No. 5,676,404, issued Oct. 14, 1997, which discloses a low profile flanged tee for a hopper, including in one embodiment thereof an integral flange positioned around an opening formed in a top side of an elongated hollow pipe section, which flange includes an array of holes through which bolts are passed for connection of the tee to the bottom of a hopper, typically with a valve disposed therebetween. Possible shortcomings or disadvantages of the Sisk low profile tee include that, in the event it is required or desired to remove the tee, for instance, due to damage or clogging, the valve must also be removed, or connected in some manner to the hopper separately from the tee. Additionally, when used with a butterfly type valve, the low profile design may result in a lower portion of the valve member being disposed in the horizontal flow path through the tee so as to possibly interfere with material flow therethrough. Further, it is observed that the disclosed embodiments of the Sisk low profile tee do not include bolt holes through the portions of the flange located directly above the horizontal pipe section, which could possibly lead to weakened sealing in those regions.

Thus, what is sought is a hopper fitting, and particularly a tee, having a low vertical profile and other advantages, which overcomes one or more of the shortcomings and disadvantages set forth above.

SUMMARY OF THE INVENTION

What is disclosed is a dual flange hopper fitting which provides one or more of the advantages, and overcomes one or more of the shortcomings or disadvantages, set forth above.

According to a preferred aspect of the invention, a dual flange hopper fitting is disclosed including a lower hollow pipe section defining an interior cavity and at least one open end portion in connection with the interior cavity. The fitting includes an upper hollow pipe section integral with and projecting upwardly from the lower hollow pipe section, the upper hollow pipe section defining an interior passage connecting with and extending upwardly from the interior cavity to an upwardly facing upper opening. The upper hollow pipe section includes an upper portion having a pair of wings or partial flanges extending sidewardly in opposite directions therefrom, each of the wings including an upwardly facing wing surface located a predetermined distance higher than one or more upper peripheral portions of the lower hollow pipe section. The fitting further includes a separate or loose flange or ring including oppositely facing flange surfaces extending around and defining an aperture therethrough configured for cooperatively receiving, or mating or assembling with, the upper portion of the hollow pipe section such that one of the flange surfaces is positioned so as to at least generally face the upwardly facing wing surfaces of the wings and is located about the predetermined distance above the upper peripheral portions of the end portions of the lower hollow pipe section. When the flange is positioned in this manner, the other of the flange surfaces will face upwardly. The flange or ring has an array of holes therethrough positioned such that when the upper portion of the upper hollow pipe section is cooperatively received in the aperture of the flange or ring, or otherwise mated or assembled with the flange or ring, some of the holes will be positioned so as to be at least generally aligned with holes through the wings, respectively, for jointly receiving a first plurality of fasteners therethrough for attaching the fitting and the flange or ring to a bottom of a hopper beneath an opening or discharge outlet thereof, and at least one other of the holes, and more preferably several of the holes, will be located in spaced relation above the lower hollow pipe section for receiving at least one fastener therethrough for attaching the flange or ring to a bottom of a hopper independently of the fitting. A plurality of fasteners, such as threaded fasteners or the like, are insertable through the aligned holes through the flange or ring and the wings, for jointly attaching the fitting and the flange or ring to the bottom of a hopper. One or more additional fasteners are insertable through the other or others of the holes through the flange or ring, separately from the fitting, for attachment to the bottom of the hopper, such that when the fitting and the flange or ring are jointly attached to the bottom of a hopper by the first plurality of fasteners, and the flange or ring is also separately or independently attached to the hopper by the additional fastener or fasteners, the first fasteners are removable to allow detachment and removal of the fitting from the hopper independently of the flange or ring. The fitting is also installable independently of the flange or ring.

Additionally, a valve or valve assembly can be disposed between the flange or ring and the bottom of a hopper, and supported by the flange or ring, such that the fitting can be removed separately of the valve and replaced, as desired or required, without requiring removal of the valve or valve assembly.

As a result, an advantage of the present invention is that in the event of clogging or blocking of the hopper fitting, or damage thereto, it can be separately removed from a hopper and replaced, while the valve remains securely mounted on the hopper so as to be capable of preventing flow through the discharge outlet thereof.

As another advantage, the dual flange fitting of the invention can have a lower profile compared to known standard hopper tees and other fittings, yet it facilitates opening of the valve or valve assembly thereof without the valve member being disposed in a path of flow through the lower hollow pipe section of the fitting.

DETAILED DESCRIPTION OF THE INVENTION

Figure 1:
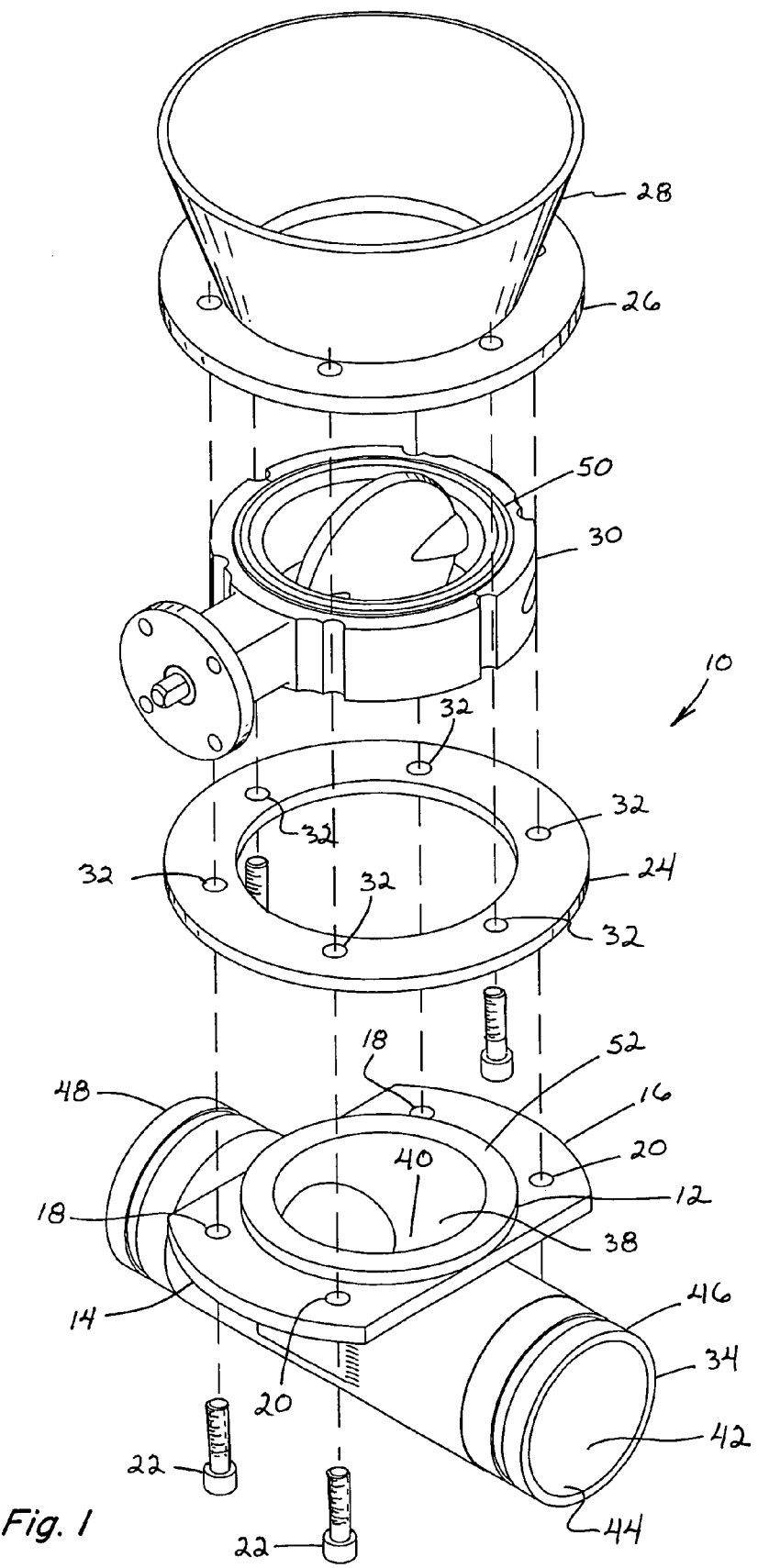
FIG. 1 is an exploded perspective view of a dual flange hopper fitting of the invention which is a tee, illustrating attachment thereof to a mounting flange on a bottom of a hopper using a plurality of fasteners.
Figure 2:
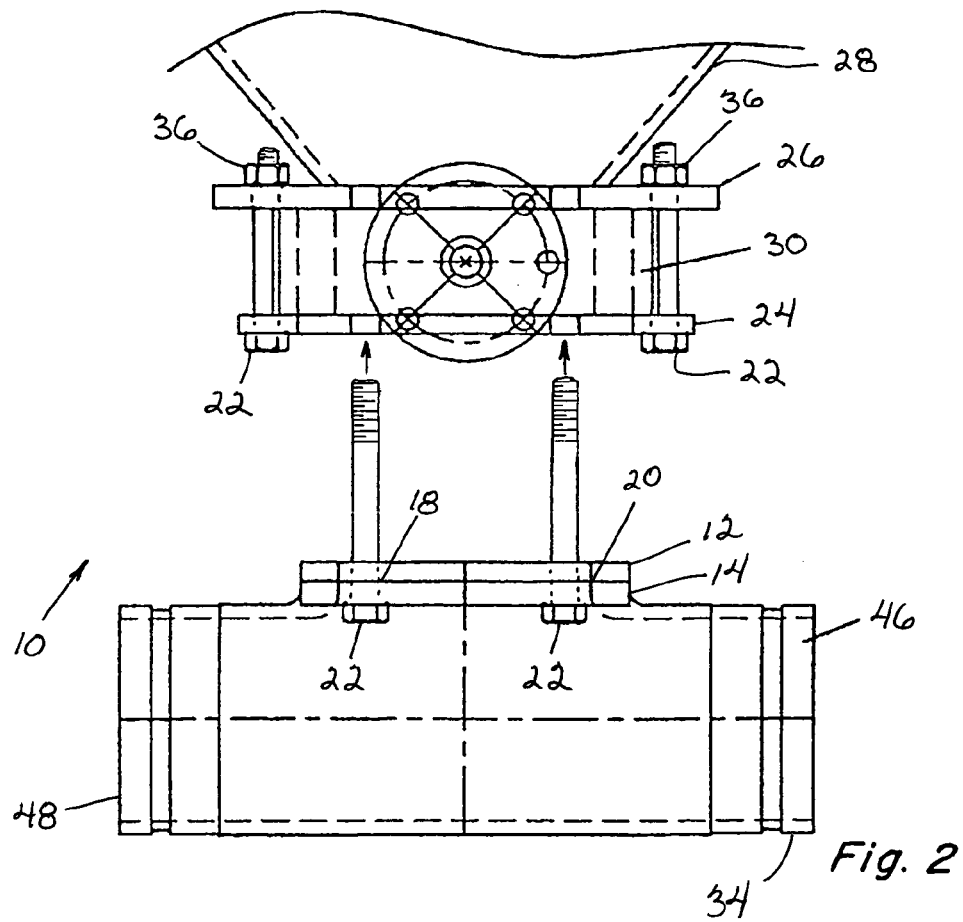
FIG. 2 is a side view of the hopper tee of FIG. 1, illustrating a flange or ring thereof attached to a mounting flange on the bottom of the hopper holding a valve in covering relation to a discharge outlet of the hopper, and the hopper tee positioned for attachment to the hopper.
Figure 3:
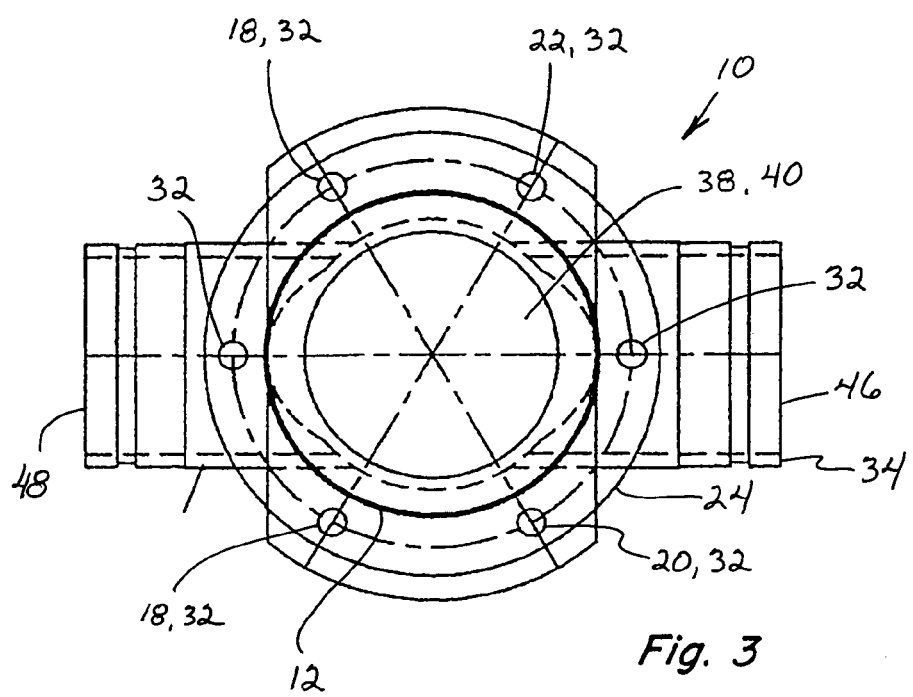
FIG. 3 is a top view of the hopper tee of the invention showing the flange or ring superimposed thereon to illustrate cooperation therebetween and locations of holes for mounting to a mounting flange of a hopper.
Figure 4:
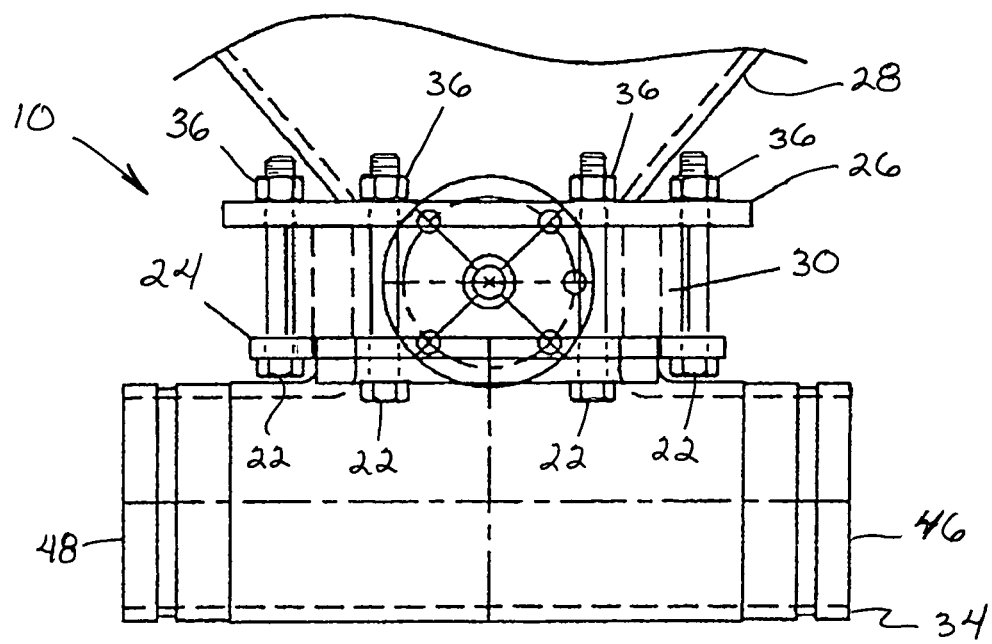
FIG. 4 is another side view of the hopper tee of FIG. 1, shown attached to a mounting flange of a hopper.
Figure 5:
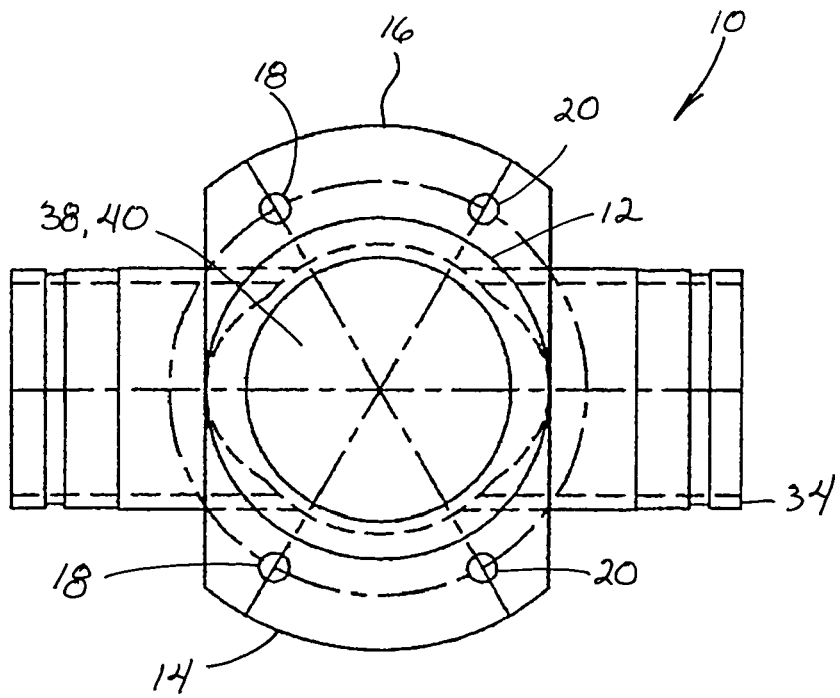
FIG. 5 is another top view of the hopper tee.

Referring now to the drawings, FIGS. 1, 2, 3, 4 and 5, a preferred dual flange tee 10 constructed and operable according to the teachings of the present invention is shown. The dual flange tee 10, in pertinent part, includes a vertical upper hollow pipe section 12 having sidewardly extending wings 14 and 16 at the upper extent of the section. Each of the wings 14 and 16 includes holes 18 and 20 therethrough for receiving a plurality of fasteners, such as conventional bolts 22 therethrough, for attachment to a lower ring 24, which can also be referred to also as a loose flange, which mounts to a bottom flange 26 extending around a discharge outlet of hopper 28. Bottom flange 26 of the hopper 28 includes an array of vertical holes therethrough at spaced locations therearound adapted for receiving fasteners such as bolts 22 therein for holding objects thereto. The lower ring 24 or loose flange is configured to cooperate with and to support or hold a valve 30 in place under the bottom-flange 26 of the hopper 28. For this, loose flange or lower ring 24 includes an array or plurality of bolt holes 32 therethrough corresponding in pattern and location to the holes in bottom flange 26 of hopper 28. A plurality of the holes 32 are alignable with holes 18 and 20 of wings 14 and 16, and also with selected ones of the holes of the bottom flange 26, for receiving fasteners such as bolts 22 therethrough, for jointly holding ring 24 and the tee to bottom flange 26. At the same time, some others of holes 32 will be aligned at least generally with an axis of a horizontal lower hollow pipe section 34 of the tee 10, and with others of the holes of bottom flange 26, and can be used for supporting ring 24 and valve 30 independently of the tee, as best illustrated by FIG. 2. Bolts 22 inserted through all of these holes can be threadedly fastened to the hopper flange 26 located above the valve 30, or attached thereto with nuts 36 (FIGS. 2 and 4).

The upper hollow pipe section 12 is preferably relatively short in height and substantially uniform in internal diameter, defining an upper opening 38. Upper opening 38 connects with a generally vertical internal passage 40 which extends upwardly through upper hollow pipe section 12, from a horizontal internal cavity 42 (FIG. 1) through lower hollow pipe section 34. Internal cavity 42 is preferably open on both opposite ends, as illustrated by opening 44. Lower hollow pipe section 34 includes opposite end portions 46 and 48, which are connectable, respectively, in the well known conventional manner to hoses or pipes (not shown) for conveying material therethrough.

The upper hollow pipe section 12 is preferably of equal or slightly larger diameter than the lower horizontal pipe section 34. For example, one embodiment can have a 5" diameter vertical pipe section and a 4" diameter horizontal pipe section. Other configurations can include, but are not limited to, a 4", 6" or 8" diameter vertical pipe section and a 4" horizontal pipe section, all of which are preferably of uniform diameter. The juncture between the upper and lower pipe sections is preferably approximately a straight intersection, the inner surfaces of adjacent portions of the upper and lower pipe sections being oriented at about a 90° angle.

Valve 30 is a conventionally operable device or assembly including a generally ring shape housing having a passage therethrough and a valve member in the passage movable in the conventional manner by an external handle or the like (not shown) between a closed position for preventing flow through the passage, and an open position for allowing flow therethrough. Valve 30 includes upper and lower seal elements therearound, illustrated by upper seal element 50 (FIG. 1), which can be a rubbery gasket or the like, positioned for forming sealed conditions with bottom flange 26 of hopper 28 around the discharge outlet thereof, and with tee 10 around upper opening 38, respectively, upper hollow pipe section 12 preferably including an upwardly facing surface 52 sealably engageable with the lower seal element for this purpose. Surface 52 is preferably annular, and has an outer diametrical extent smaller than an inner diametrical extent of ring 24, to allow cooperative receipt of the upper portion of upper hollow pipe section 12 within the aperture defined by ring 24, and such that upwardly facing wing surfaces of wings 14 and 16 will be located in facing relation to a downwardly facing surface of ring 24 when tee 10 is attached. Surface 52 and/or the upwardly facing wing surfaces of wings 14 and 16 are preferably located a predetermined spaced distance higher than an upper periphery of end portions 46 and 48 of lower hollow pipe section 34 of tee 10, such that when the tee is attached to the hopper, adequate clearance is provided for the bolts 22 located in the holes through ring 24 above the end portions 46 and 48. Surface 52 should also be spaced adequately above the wing surfaces, such as about equal to the thickness of ring 24, to facilitate forming the sealed condition with the lower seal element of valve 30 when tee 10 is installed.

Figure 6:
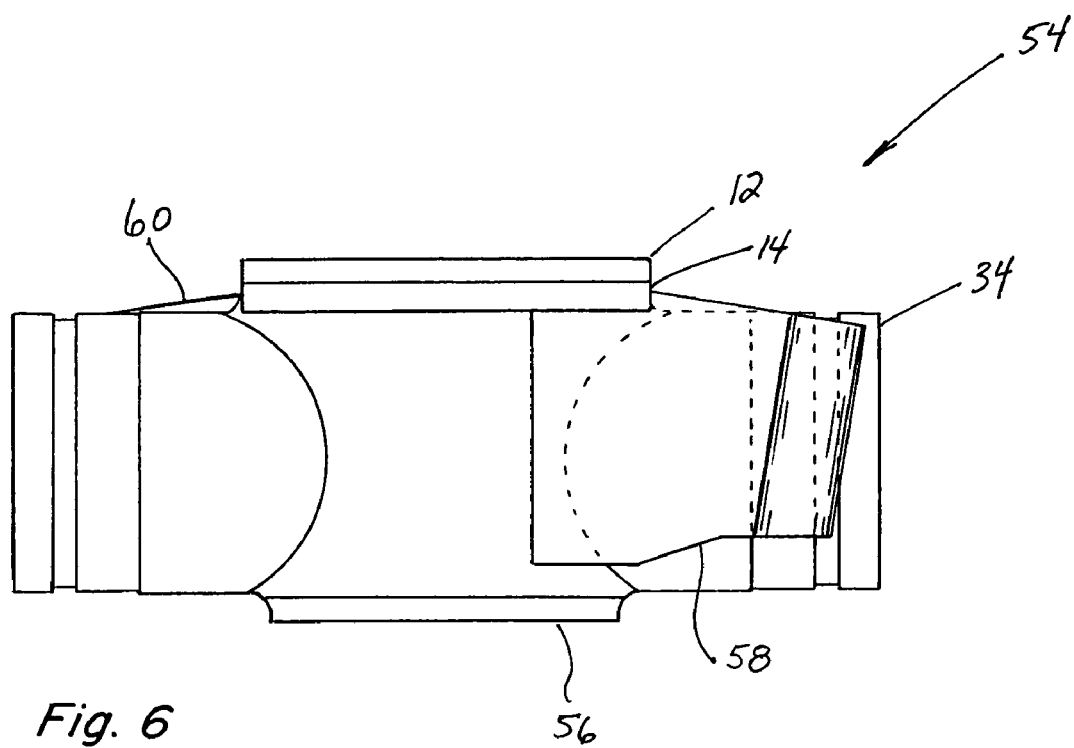
FIG. 6 is a side view of an alternative tee of the invention.
Figure 7:
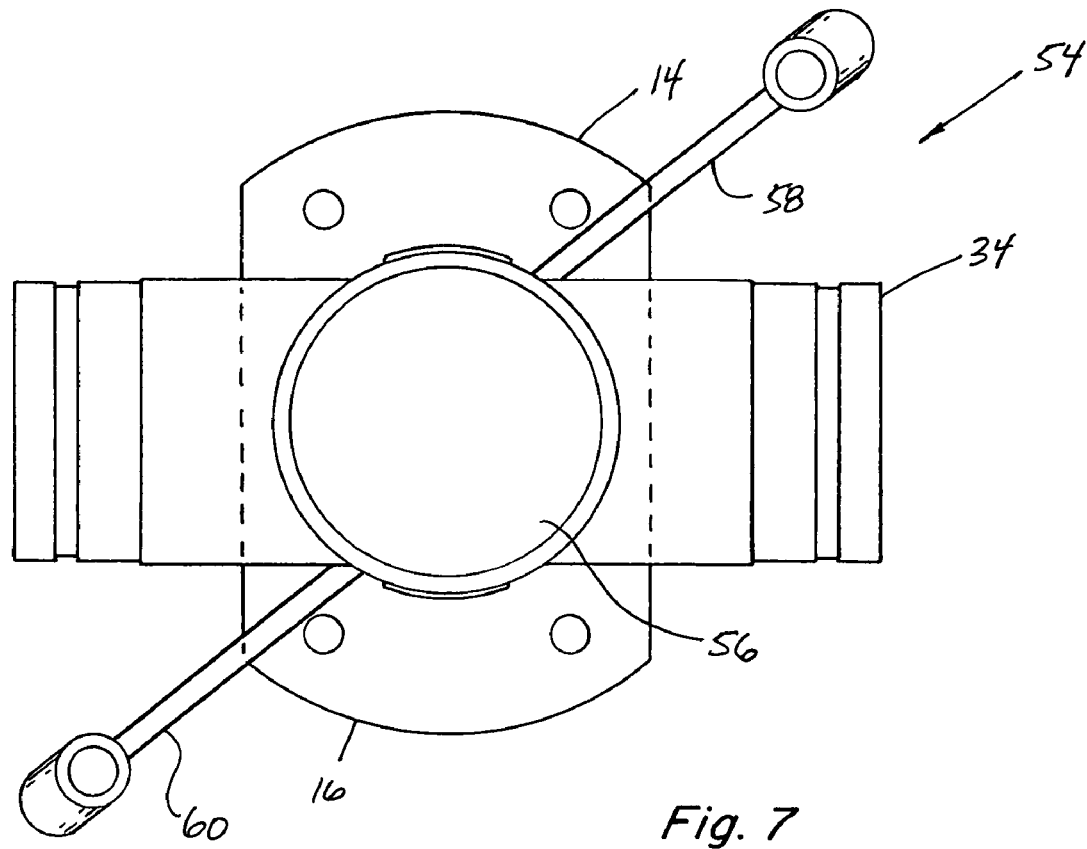
FIG. 7 is a bottom view of the tee of FIG. 6.

Referring also to FIGS. 6 and 7, another dual flange hopper tee 54 constructed and operable according to the teachings of the present invention is shown, like parts of tee 54 and tee 10 being identified by like numbers. Tee 54 is a bottom dump type tee, including a bottom dump opening 56, and ears 58 and 60 extending diagonally outwardly therefrom and disposed for receiving threaded fasteners for holding a bottom cover (both not shown) for closing opening 56 in the well known manner. Tee 54 includes an upper hollow pipe section 12, a lower hollow pipe section 34 and wings 14 and 16, constructed and operable as described above, in combination with a ring 24, for attaching to the bottom of a hopper.

Advantages of the dual flange tees 10 and 54 of the invention include about a one inch increase in ground clearance compared to traditional tees. The invention also allows removal of the tees 10 and 54 without removal of the valve 30. Also, when the valve 30 is open, the valve member thereof does not drop into the flow through the internal cavity 42 of lower pipe section 34.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments, for instance having different diameter pipe sections, without departing from the scope of the invention. Accordingly, the following claims are intended to protect the invention broadly as well as in the specific form shown.

What is claimed is:

1. A hopper fitting, comprising:
a fitting including a lower hollow pipe section defining an interior cavity, the lower pipe section having at least one open end portion in connection with the interior cavity, the fitting including an upper hollow pipe section integral with and projecting upwardly from the lower hollow pipe section, the upper hollow pipe section defining an interior passage connecting with and extending upwardly from the interior cavity to an upwardly facing upper opening, the upper hollow pipe section including an upper portion having a pair of wings extending sidewardly in opposite directions therefrom, each of the wings including an upwardly facing wing surface located a predetermined distance higher than upper peripheral portion of the lower hollow pipe section; and
a flange including oppositely facing flange surfaces extending around and defining an aperture therethrough configured for cooperatively receiving the upper portion of the upper hollow pipe section such that one of the flange surfaces is positionable so as to at least generally face the upwardly facing wing surfaces of the wings and is located about the predetermined distance above the upper peripheral portion of the lower hollow pipe section, and the other of the flange surfaces will face upwardly, the flange having an array of holes therethrough positioned such that when the upper portion of the upper hollow pipe section is cooperatively received in the aperture some of the holes will be positioned so as to be at least generally aligned with holes through the wings, respectively, for jointly receiving fasteners therethrough, respectively, for attaching the fitting and the flange to a bottom of a hopper beneath an opening thereof, and at least one other of the holes will be located over and spaced above the lower hollow pipe section for receiving at least one additional fastener therethrough for attaching the flange to a bottom of a hopper independently of the fitting, wherein the upper hollow pipe section includes an annular surface around the upwardly facing opening spaced a predetermined vertical distance above the wing surfaces, and the flange has a thickness between the flange surfaces thereof which is about equal to the vertical distance of the annular surface above the wing surfaces.

2. The hopper fitting of claim 1, further comprising a first plurality of threaded fasteners insertable through said some of the holes, respectively, for jointly attaching the fitting and the flange to a bottom of a hopper.

3. The hopper fitting of claim 2, further comprising at least one additional threaded fastener insertable through the at least one other of the holes for attaching the flange to a bottom of a hopper, such that when the fitting and the flange are jointly attached to a bottom of a hopper by the plurality of fasteners and the flange is attached to the hopper by the at least one additional fastener, the plurality of fasteners will be removable to allow detachment of the fitting from the hopper independently of the flange.

4. The hopper fitting of claim 3, further comprising a valve configured to be supported by the flange above the fitting.

5. The hopper fitting of claim 1, wherein the wings each include at least two of the holes therethrough and the array of holes through the flange includes holes positioned to be aligned with the at least two holes through the wings, respectively.

6. The hopper fitting of claim 1, wherein the fitting comprises a tee.

7. The hopper tee assembly of claim 6, further, comprising a valve supported in sealed relation between the tee and the bottom of the hopper.

8. The hopper tee assembly of claim 7, wherein the fasteners extending through the holes located in overlaying relation to holes in the wings of the upper hollow pipe section can be removed for allowing removal of the tee from the hopper while the flange and the valve remain attached to the hopper.

9. A hopper tee assembly for a discharge outlet of a hopper tee, comprising:
a tee including a lower hollow pipe section defining an interior cavity, the lower pipe section having a first end portion, an opposite second end portion, and an intermediate portion between the first and second end portions, at least one of the first and second end portions including an opening connecting with the interior cavity, the tee including an upper hollow pipe section integral with and projecting upwardly from the intermediate portion of the lower hollow pipe section, the upper hollow pipe section defining an interior passage connecting with and extending upwardly from the interior cavity to an upwardly facing upper opening, the upper hollow pipe section including an upper portion having a pair of wings extending sidewardly in opposite directions therefrom and an upwardly facing annular surface disposed between the wings and extending around the upper opening, each of the wings including an upwardly facing wing surface located a predetermined distance higher than upper peripheral portions of the first and second end portions of the lower hollow pipe section;
a flange including oppositely facing flange surfaces extending around and defining an aperture therethrough, the upper hollow pipe section being cooperatively received in the aperture such that one of the flange surfaces is positioned in generally opposing relation with the upwardly facing wing surfaces of the wings and located about the predetermined distance above the upper peripheral portions of the end portions of the lower hollow pipe section, and the other of the flange surfaces faces upwardly, the flange having an array of holes therethrough including holes located in overlaying relation to holes in the wings of the upper hollow pipe section and other holes located and spaced at least generally above the first and second end portions of the lower hollow pipe section, respectively; and fasteners extending through the holes attaching the tee and the flange to a bottom of a hopper in covering relation to a discharge outlet thereof, wherein the upwardly facing annular surface is spaced a predetermined vertical distance above the wing surfaces, and the upwardly facing annular surface is spaced a predetermined vertical distance above the wing surfaces.

10. The hopper tee assembly of claim 9, wherein the wings each include at least two of the holes therethrough and the away of holes through the flange includes holes positioned to be aligned with the at least two holes through the wings, respectively.

11. The hopper tee assembly of claim 9, wherein the fasteners extending through the holes located in overlaying relation to holes in the wings of the upper hollow pipe section can be removed for allowing removal of the tee from the hopper while the flange remains attached to the hopper.

12. The hopper tee assembly of claim 9, wherein the flange includes at least six holes therethrough including at least one hole located at least generally above each of the end portions of the lower hollow pipe section, respectively.

13. A hopper tee kit for mounting to a mounting flange extending around a discharge outlet on a lower end of a hopper, comprising:

a valve including opposite upper and lower end portions, the upper end portion being positionable in cooperation with a mounting flange of a hopper for forming a sealed condition therearound, the valve including a valve member movable between a closed position preventing flow through the valve between the opposite ends thereof and an open position for allowing flow therethrough;

a ring defining an aperture therethrough and including an array of holes at spaced locations around the aperture corresponding to spaced locations of holes through a mounting flange of a hopper, the ring being configured to be positionable around and in supportive relation to the lower end portion of the valve;

a hopper tee including a generally horizontally extending lower hollow pipe section and a generally vertically extending upper hollow pipe section extending upwardly from the lower hollow pipe section to an upwardly facing opening positionable in sealed relation to the lower end portion of the valve such that material which flows through the valve will flow into the hopper tee through the upwardly facing opening, the upper hollow pipe section including a pair of wings extending sidewardly therefrom on opposite sides of the upwardly facing opening, the wings including holes therethrough positionable, respectively, in alignment with selected ones of the holes of the ring when the upwardly facing opening is positioned in sealed relation to the lower end portion of the valve and such that others of the holes of the ring will be located in spaced relation above opposite ends of the lower hollow pipe section, respectively, wherein the upper hollow pipe section includes an upwardly facing annular surface around the upwardly facing opening spaced a predetermined vertical distance above upwardly facing surfaces of the wings, and the ring has a thickness which is about equal to the vertical distance of the annular surface above the surfaces of the wings.

14. The hopper tee kit of claim 13, further comprising a plurality of fasteners including fasteners insertable jointly through the holes through the wings and the selected ones of the holes through the ring and into selected ones of holes through a mounting flange of a hopper for attaching the tee, the ring, and the valve to the mounting flange, and fasteners insertable through the others of the holes through the ring and into other holes through the mounting flange for attaching just the ring and the valve thereto.

15. The hopper tee kit of claim 13, wherein the ring includes at least six holes therethrough including at least one hole located so as to be disposed at least generally above each of the end portions of the lower hollow pipe section of the tee, respectively, when the ring and the tee are positioned for attachment to a mounting flange of a hopper.

* * * * *

UNITED STATES PATENT AND TRADEMARK OFFICE
CERTIFICATE OF CORRECTION

PATENT NO. : 7,568,496 B2  
APPLICATION NO. : 11/250777  
DATED : August 4, 2009  
INVENTOR(S) : David G. Kraenzle Page 1 of 1

It is certified that error appears in the above-identified patent and that said Letters Patent is hereby corrected as shown below:

Column 7, line 22, "away" should be --array--.

Signed and Sealed this

Twenty-ninth Day of September, 2009

David J. Kappos
*Director of the United States Patent and Trademark Office*